(12) United States Patent
Wang

(10) Patent No.: US 11,512,804 B2
(45) Date of Patent: Nov. 29, 2022

(54) EXPANSION TANK

(71) Applicant: Shih-Hsin Wang, Taichung (TW)

(72) Inventor: Shih-Hsin Wang, Taichung (TW)

( * ) Notice: Subject to any disclaimer, the term of this patent is extended or adjusted under 35 U.S.C. 154(b) by 0 days.

(21) Appl. No.: 17/345,824

(22) Filed: Jun. 11, 2021

(65) Prior Publication Data

US 2022/0333726 A1 Oct. 20, 2022

(30) Foreign Application Priority Data

Apr. 19, 2021 (TW) .................................. 110113984

(51) Int. Cl.
*F16L 55/053* (2006.01)

(52) U.S. Cl.
CPC .................................. *F16L 55/053* (2013.01)

(58) Field of Classification Search
CPC .. F24D 3/1008; F24D 3/1016; F16L 55/0338; F17C 1/00; B65D 1/32; F15B 1/10; F15B 1/22
USPC ........... 138/26, 30; 220/4.12, 581, 584, 601, 220/661, 720, 721, 723
See application file for complete search history.

(56) References Cited

U.S. PATENT DOCUMENTS

| | | | |
|---|---|---|---|
| 3,524,475 A * | 8/1970 | Kirk, Jr. ................ | F24D 3/1008 138/30 |
| 5,386,925 A | 2/1995 | Lane | |
| 6,517,117 B1 * | 2/2003 | Lai .......................... | F16L 5/10 285/139.2 |
| 6,915,922 B2 * | 7/2005 | Wang .................... | B67D 7/0288 220/721 |
| 8,033,416 B2 * | 10/2011 | Wang ........................ | F17C 1/00 220/721 |
| 8,403,170 B1 * | 3/2013 | Lai ........................... | F15B 1/14 220/721 |
| 8,523,001 B2 * | 9/2013 | Acker ........................ | F16J 3/02 220/721 |
| 9,255,663 B2 | 2/2016 | Wang | |

FOREIGN PATENT DOCUMENTS

GB 1209731 A 10/1970

* cited by examiner

*Primary Examiner* — Patrick F Brinson
(74) *Attorney, Agent, or Firm* — Muncy, Geissler, Olds & Lowe, P.C.

(57) ABSTRACT

The present invention discloses an expansion tank comprises an upper barrel, a plastic lining and a leak-proof padding located in the upper barrel. The plastic lining has a first groove facing the upper barrel and a top surface located around the first groove. The first groove is covered by the upper barrel; the top surface abuts on the upper barrel, and the leak-proof padding is stuffed in the first groove of the plastic lining.

6 Claims, 5 Drawing Sheets

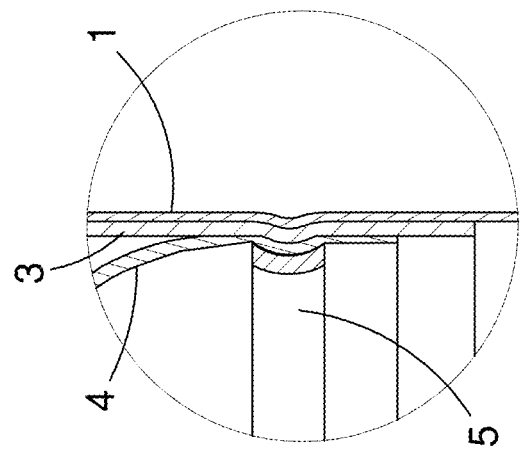
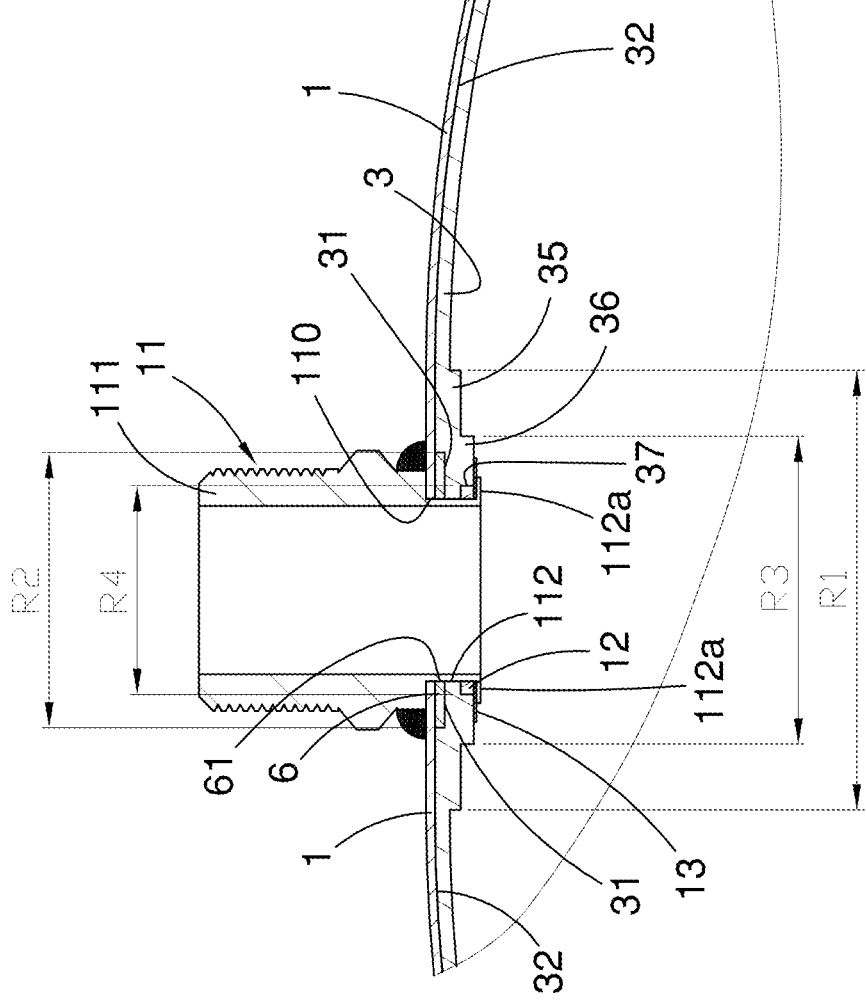
FIG. 6
FIG. 5

EXPANSION TANK

FIELD OF INVENTION

The present invention is related to the structure of the expansion tank.

RELATED PRIOR ART

Expansion tanks are common amongst the usage of water supply systems to play the role of balancing water pressure. Additionally, expansion tanks are often connected to the reverse osmosis water purifier for storing the purified water produced by the reverse osmosis water purifier. The detailed structure of these type of expansion tanks can be found in Patent Nos: U.S. Pat. Nos. 6,915,922; 6,517,117; 5,386,925; 9,255,663 and Patent Publication No. GB 1209731.

FIG. 7 disclosed a traditional expansion tank 9 comprising a metal barrel 91 and a plastic lining 92 configured in the metal barrel 91, a flexible bladder 93 and a retaining ring 94. The metal barrel 91 usually comprises an upper barrel 91 and a lower barrel. The plastic lining 92 and the flexible bladder 93 are shaped to be fitted in the upper barrel 91 and pressured onto the upper barrel 91 altogether with the retaining ring 94. A water storage compartment 901 with variable volume can be formed between the plastic lining 92 and the flexible bladder 93, an air storage compartment 902 with variable volume can be formed between the flexible bladder 93 and the lower barrel 912.

The top portion of the upper barrel 911 has a pipe joint 95, the pipe joint 95 is connected to the aforementioned water supply systems or reverse osmosis water purifiers (not shown in the drawings), so that the water in the water supply systems or reverse osmosis water purifiers can enter and exit the water storage compartment 901 through the pipe joint 95. The bottom of the lower barrel 912 has an inflatable one-way valve 96; the inflatable one-way valve 96 is for pumping and refilling the air in the air storage compartment 902. As shown in FIG. 7, when the water pressure of the water supplying systems or the reverse osmosis water purifiers is greater than the pressure in the air storage compartment 902, the water in the water supplying systems or the reverse osmosis water purifiers will flow into the water storage compartment 901 through the pipe joint 95 as temporary storage, and causing the flexible bladder 93 to compress the air storage compartment 902 so that the pressure in the air storage compartment 902 increases. Moreover, when the water pressure of the water supply systems or the reverse osmosis water purifiers are less than the pressure in the air storage compartment 902, the water temporarily stored in the water storage compartment 901 will be pushed out of the pipe joint 95 by the flexible bladder 93, so that the pressure in the air storage compartment 902 decreases.

As shown in FIGS. 7 and 8, a leak-proof padding 951 which is made of rubber is usually configured between the upper barrel 911 and the plastic lining 92. The pipe joint 95 of the expansion tank will pass through a through-hole 951a formed at the center of the leak proof padding 951. The leak-proof padding 951 has a certain thickness and diameter, which creates a gap 950 between the top surface of the plastic lining 92 and the upper barrel 911. The greater the volume of the expansion tank 9, the greater the diameter of the pipe joint 95, and the greater the thickness and diameter of the leak-proof padding 951, and the greater the above-mentioned gap 950 will be. This gap 951 allows the plastic lining 92 to move towards the upper barrel 911, for example, each time the flexible bladder 93 in the expansion tank 9 pushes water out of the pipe joint 95, the plastic lining 92 will be pushed upwards by the pressure caused by the water. Even though the plastic lining 92 is secured by the retaining ring 94 mentioned above, but after multiple upward movements by the water pressure, the effectiveness of the retaining ring 94 may deteriorate overtime causing the plastic lining 92 to begin shifting upwards towards the upper barrel 911, once this happens, the upper barrel 911 and the retaining ring 94 will no longer be securing the plastic lining 92 and the flexible bladder 93 in between. As a result, air leakage and/or water leakage may occur between the upper barrel 911 and the retaining ring 94, and ultimately causing the expansion tank 9 to lose its existing function and it can no longer be used.

SUMMARY OF INVENTION

The present invention discloses an expansion tank comprising a metal barrel, the metal barrel having an upper barrel and a lower barrel, the upper barrel having a first through-hole. The expansion tank further comprising a pipe joint fixed on the upper barrel, and a plastic lining located in the upper barrel, a flexible bladder located in the plastic lining, a retaining ring located in the flexible bladder, and a leak proof padding; wherein the pipe joint includes an outer pipe portion and an inner pipe portion, the outer pipe portion is located on the outside of the upper barrel, and the inner pipe portion passes through the first through-hole of the upper barrel. The plastic lining has a second through-hole, the second through-hole is facing the first through-hole of the upper barrel and being passed through by the inner pipe portion of the pipe joint. Moreover, the plastic lining further comprises a first groove that is facing the upper barrel and in communication with the second through-hole and a top surface that is located around the first groove, the first groove is covered by the upper barrel and the top surface is abutted against the upper barrel. The leak-proof padding stuffed in the first groove of the plastic lining and having a third through-hole, the third through-hole is facing the first through-hole of the upper barrel, and being passed through by the inner pipe portion of the pipe joint. The flexible bladder located in the plastic lining and in between the flexible bladder and the plastic lining forming into a water storage compartment that is of variable volume, and in between the flexible bladder and the lower barrel forming into an air storage compartment that is of variable volume. The retaining ring pressures the flexible bladder and the plastic lining onto the upper barrel.

In another aspect, the aforementioned plastic lining of the expansion tank having a first protrusion protruding downwards and back facing the first groove and top surface. The first protrusion surrounding the second through-hole of the plastic lining, and the outer diameter of the first protrusion is greater than the inner diameter of the first groove.

In another aspect, the aforementioned expansion tank further comprising a leak-proof ring and a flat washer, the plastic lining having a second protrusion protruding downwards from first protrusion, the second protrusion surrounding the second through-hole of the plastic lining, and having a second groove that back faces the first groove, wherein the second groove and the second through-hole of the plastic lining communicates, and the leak-proof ring is stuffed in the second groove, the flat washer covering the second groove and the second protrusion, the end portion of the inner pipe portion passes through the leak-proof ring and the flat washer then folding backwards so that the flat washer is pressed on the second protrusion by the end portion of the inner pipe portion.

In another aspect, the outer diameter of the second protrusion of the expansion tank is smaller than the outer diameter of the first protrusion. Preferably, the outer diameter of the second protrusion of the plastic lining is greater than the inner diameter of the first groove. More preferably, the inner diameter of the second groove of second protrusion of the plastic lining is smaller than the inner diameter of the first groove.

BRIEF DESCRIPTION OF DRAWINGS

The present invention will be described via detailed illustration of the preferred embodiment referring to the drawings wherein:

FIG. 5 is a partial cross-sectional schematic view of the preferred embodiment near a pipe joint 11 of the present invention;

FIG. 6 is a partial cross-sectional schematic view of the preferred embodiment near a retaining ring 5 of the present invention;

DETAILED DESCRIPTION OF PREFERRED EMBODIMENT

Figure 1:
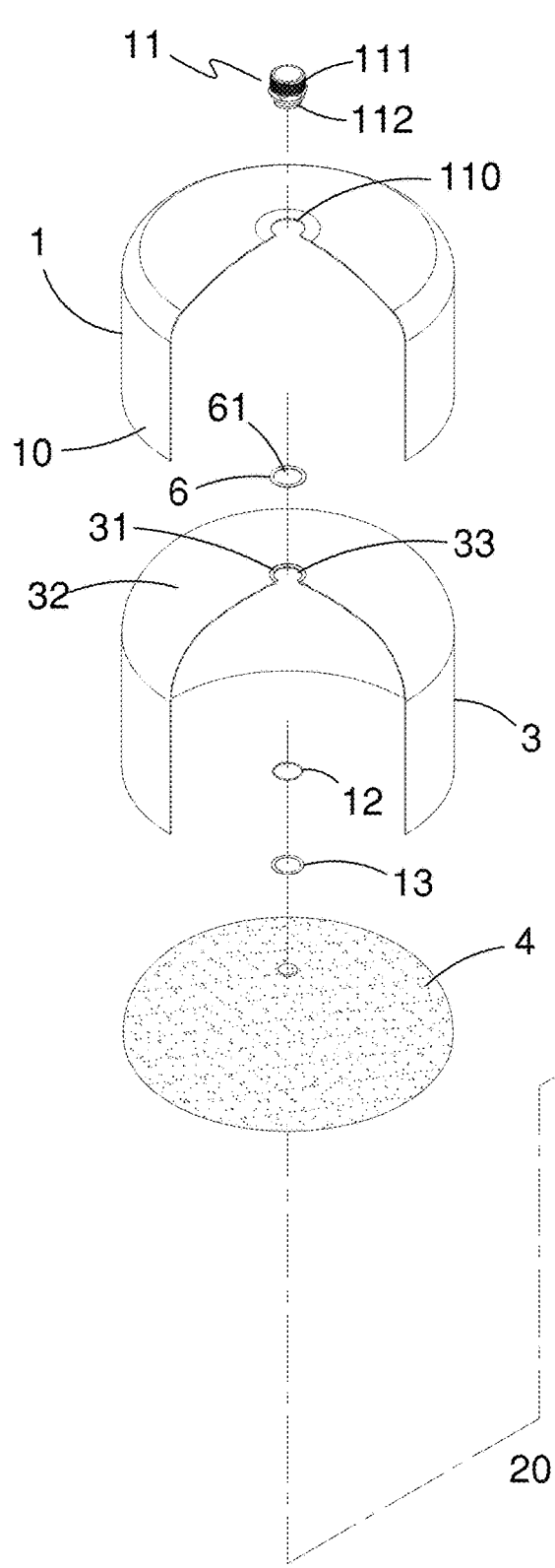
FIG. 1 is a exploded view of a preferred embodiment of the expansion tank of the present invention.
Figure 4:
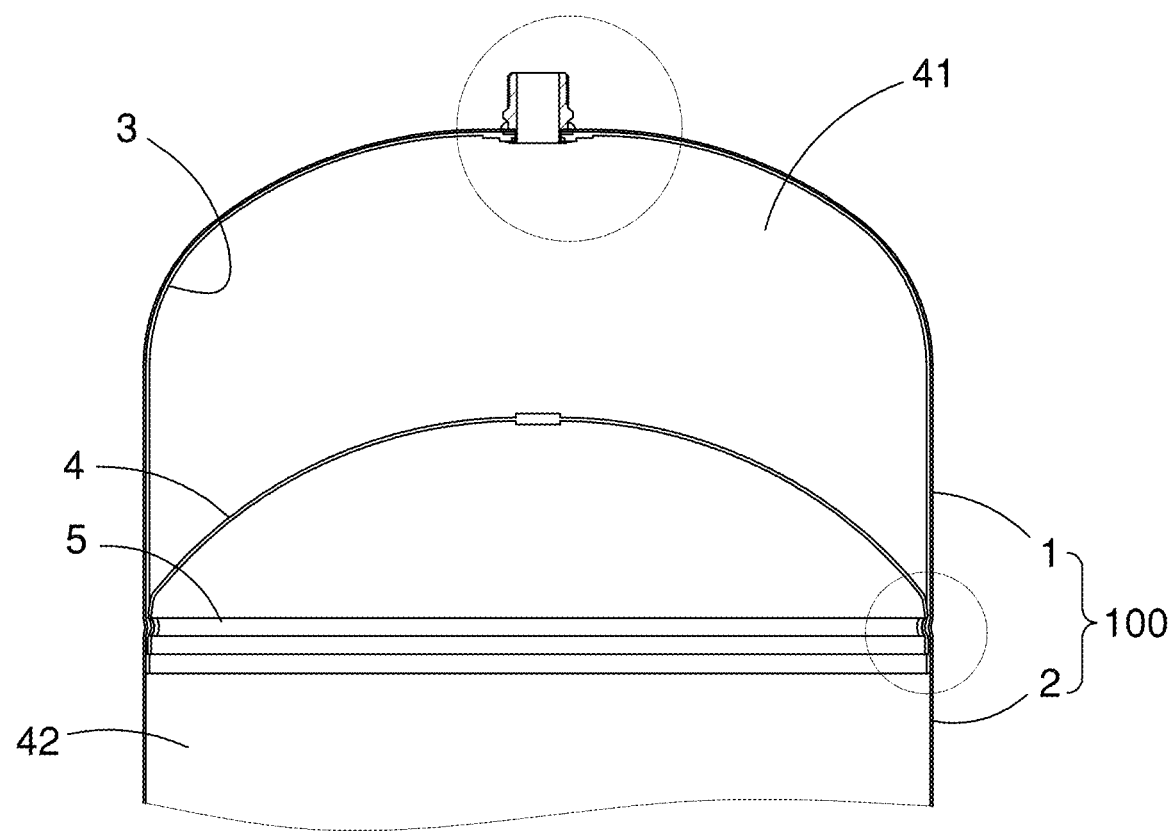
FIG. 4 is a partial cross-sectional schematic view of the preferred embodiment of the present invention.
Figure 7:
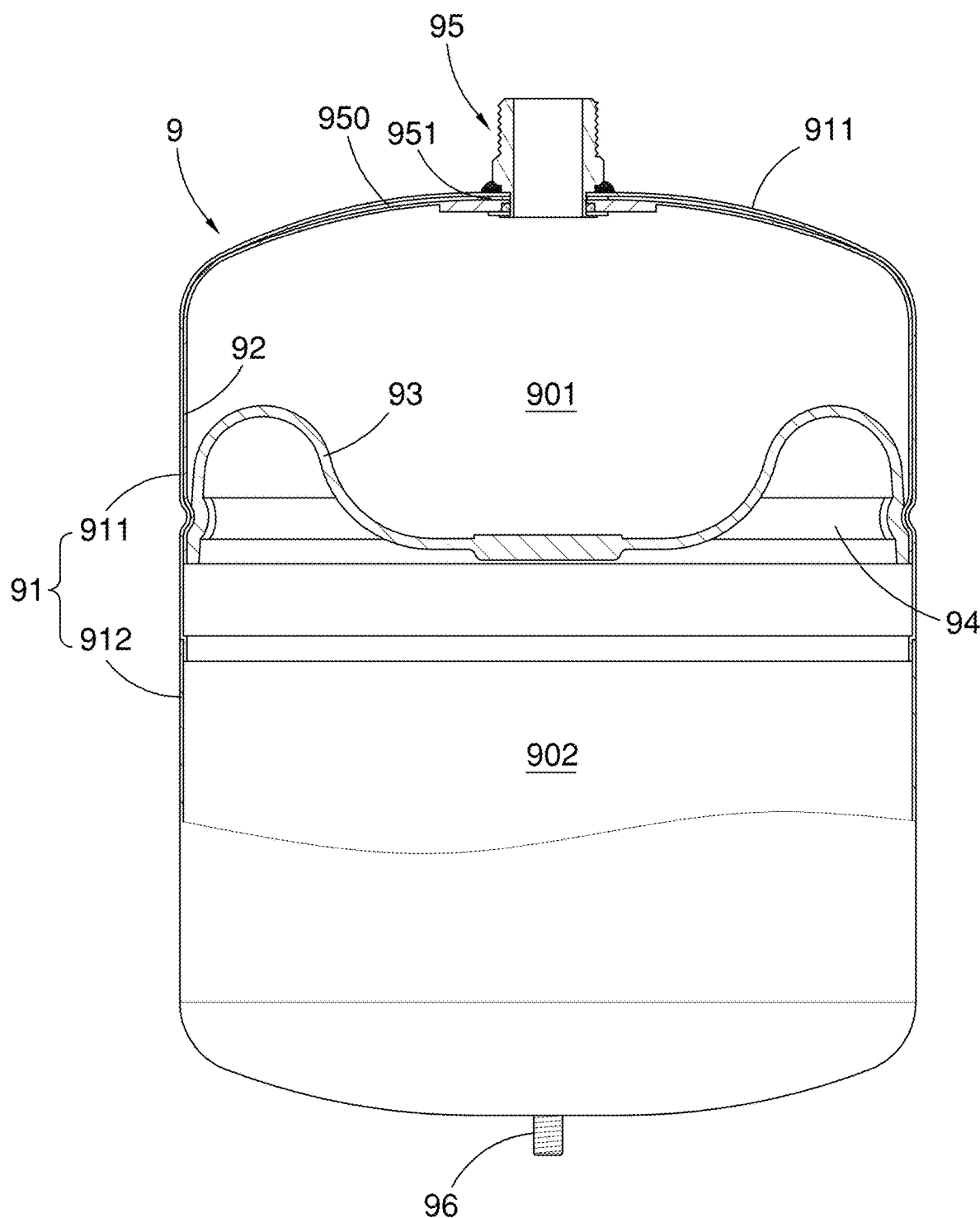
FIG. 7 is a cross-sectional schematic view of a conventional expansion tank.
Figure 8:
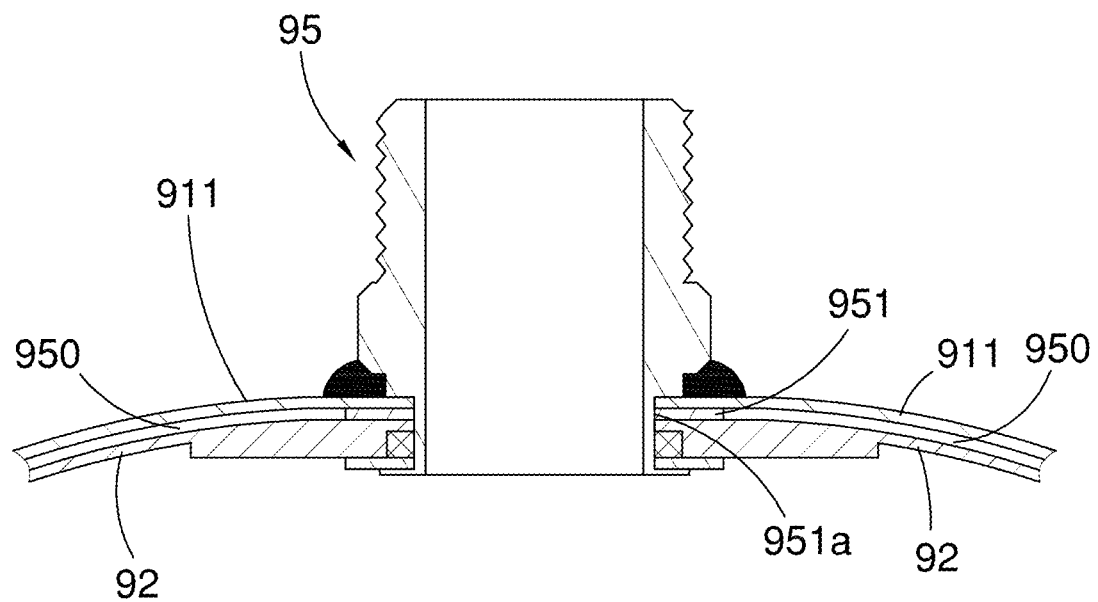
FIG. 8 is a partial cross-sectional schematic view of the conventional expansion tank.

FIGS. 1 and 4 show a preferred embodiment of an expansion tank of the present invention. The expansion tank includes a metal barrel 100 that has an upper barrel 1 and a lower barrel 2, a pipe joint 11 fixed on the upper barrel 1 of the metal barrel 100, a plastic lining 3 located in the upper barrel 1 of the metal barrel 100, a leak proof padding 6 stuffed between the upper barrel 1 of the metal barrel 100 and the plastic lining 3, a flexible bladder 4 located in the plastic lining 3, and a retaining ring 5 for pressing the flexible bladder 4 and the plastic lining 3 on the upper barrel 1 of the metal barrel 100.

A bottom of the upper barrel 1 and a top of the lower barrel 2 are joined together, so that the metal barrel 100 has a hollow interior. The upper barrel 1 and the lower barrel 2 are preferably made of iron sheet, and both are joined together by welding, but not limited to this. In which, the upper barrel 1 having a through-hole 110, an inner pipe portion 112 of the pipe joint 11 passing through the first through-hole 110 of the upper barrel 1, an outer pipe portion 111 of the pipe joint 11 is located on the outside of the upper barrel 1. Preferably, the outer pipe portion 111 is welded to the upper barrel 1. An inflation check valve 21 configured to a bottom portion of the lower barrel 2 which allows the inflator with pressure gauge to connect to the inflation check valve 21 to pump air into the lower barrel 2.

Figure 2:
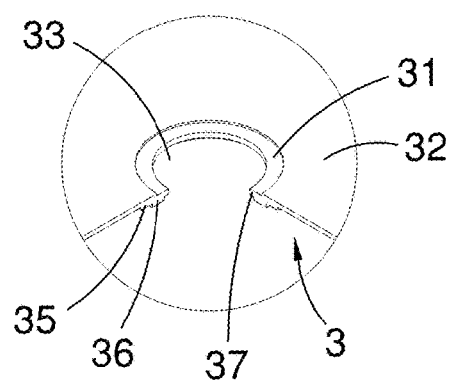
FIGS. 2 and 3 show the partial cross-sectional schematic views of the preferred embodiment of a plastic lining 3 of the present invention.
Figure 3:
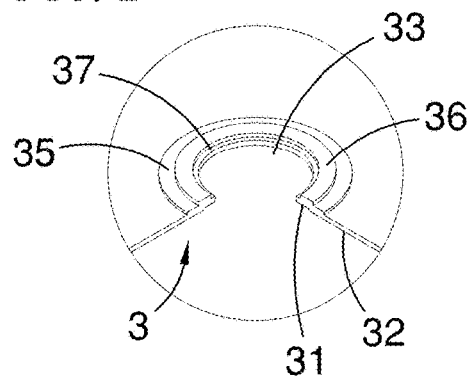

The plastic lining 3 has a second through-hole 33, the second through-hole 33 is facing the first through-hole 110 of the upper barrel 1 and being passed through by the inner pipe portion 112 of the pipe joint 11. Furthermore, as shown in FIGS. 2 and 3, the plastic lining 3 further comprising a first groove 31 that is facing the upper barrel 1 and in communication with the second through-hole 33 and a top surface 32 that is located around the first groove 31. Moreover, the leak-proof padding 6 having a third through-hole 61, the third through-hole 61 is facing the first through-hole 110 of the upper barrel 1 and is passed through by the inner pipe portion 112 of the pipe joint 11.

As shown in FIG. 5, the first groove 31 of the plastic lining 3 is covered by the upper barrel 1, the top surface 32 of the plastic lining 3 is abutted against the upper barrel 1. The leak-proof padding 6 is stuffed and filled up the first groove 31 of the plastic lining 1. In this embodiment, the leak-proof padding 6 is made of elastic material, such as rubber or silicone, with thickness slightly greater than the depth of the first groove 31; an end portion 112a of the inner pipe portion 112 of the pipe joint 11 is bent and pressed after a riveting process. Consequently, the leak-proof padding 6 will be retracted into the first groove 31 and fill up the entire first groove 31.

As shown in FIGS. 1 and 4, the flexible bladder 4 is located in the plastic lining 3, and in between the flexible bladder 4 and plastic lining 3 forms a water storage compartment 41 that is of variable volume, and in between the flexible bladder 4 and the lower barrel 2 forms into an air storage compartment 42 that is of variable volume.

As shown in FIG. 6, the retaining ring 5 is located in the flexible bladder 4 and tightly pressured the flexible bladder 4 and the plastic lining 3 onto the upper barrel 1 so that the water storage compartment 41 and the air storage compartment 42 do not communicate.

Referring to FIGS. 2, 3 and 5, the plastic lining 3 having a first protrusion 35 protruding downwards and back facing the first groove 31 and the top surface 32, the first protrusion 35 surrounding the second through-hole 33 of the plastic lining 3, and the outer diameter R1 of the first protrusion 35 is greater than the inner diameter R2 of the first groove 31.

In this embodiment, as shown in FIGS. 1 and 5, the expansion tank further comprises a leak-proof ring 12 and a flat washer 13. The plastic lining 3 having a second protrusion 36 protruding downwards from first protrusion 35, the second protrusion 36 surrounding the second through-hole 33 of the plastic lining 3, and having a second groove 37 that back faces the first groove 31, wherein the second groove 37 and the second through-hole 33 of the plastic lining 3 communicates and the leak-proof ring 12 is stuffed in the second groove 37, the flat washer 13 covering the second groove 37 and the second protrusion 36, the end portion 112a of the inner pipe portion 112 passing through the leak-proof ring 12 and the flat washer 13 then folding backwards so that the flat washer 13 is pressed on the second protrusion 36 by the end portion 112a of the inner pipe portion 112, wherein the outer diameter R3 of the second protrusion 36 is smaller than the outer diameter R1 of the first protrusion 35, but greater than the inner diameter R2 of the first groove 31. Furthermore, the inner diameter R4 of the second groove 37 of the second protrusion 36 of the plastic lining 3 is smaller than the inner diameter R1 of the first groove 31.

The expansion tank of the present invention uses the first groove 31 of the plastic lining 3 to contain the leak-proof padding 6, so that the top surface 32 of the plastic lining 3 abuts the upper barrel 1 could remove the gap formed between the plastic lining 3 and the upper barrel 1 by the leak-proof padding 6, and thus solve the problem of air leakage and/or water leakage that occurs in conventional expansion tanks. Moreover, the plastic lining 3 further comprises a first protrusion 35 and a second protrusion 36, so that an inner wall of the plastic lining 3 appears to have multiple levels which ensure this part of the structure of the expansion tank is not easily damaged.

What is claimed is:

1. An expansion tank comprising:
   a metal barrel having an upper barrel and a lower barrel, the upper barrel having a first through-hole;
   a pipe joint fixed on the upper barrel and having an outer pipe portion and an inner pipe portion, the inner pipe portion passing through the first through-hole of the upper barrel;
   a plastic lining located in the upper barrel and having a second through-hole, the second through-hole facing the first through-hole of the upper barrel and being passed through by the inner pipe portion of the pipe joint, wherein the plastic lining further comprises a first groove that is facing the upper barrel and in communication with the second through-hole and a top surface that is located around the first groove, the first groove is covered by the upper barrel abutted and the top surface is abutted against the upper barrel;
   a leak-proof padding positioned within the first groove of the plastic lining and having a third through-hole, the third through-hole is facing the first through-hole of the upper barrel and being passed through by the inner pipe portion of the pipe joint;
   a flexible bladder positioned radially within the plastic lining such that in between the flexible bladder and the plastic lining a water storage compartment is formed, and in between the flexible bladder and the lower barrel an air storage compartment is formed; and
   a retaining ring positioned radially within the flexible bladder such that the retaining ring presses a pressured portion of the flexible bladder and a pressured portion of the plastic lining onto the upper barrel so that the water storage compartment and the air storage compartment do not communicate.

2. The expansion tank as recited in claim 1, wherein the plastic lining has a first protrusion protruding downwards and back facing the first groove and the top surface, the first protrusion surrounds the second through-hole of the plastic lining, and the outer diameter of the first protrusion is greater than the inner diameter of the first groove.

3. The expansion tank as recited in claim 2 comprising a leak-proof ring and a flat washer, the plastic lining having a second protrusion protruding downwards from the first protrusion, the second protrusion surrounding the second through-hole of the plastic lining, and having a second groove that back faces the first groove, wherein the second groove and the second through-hole of the plastic lining communicates and the leak-proof ring is positioned within the second groove, the flat washer covers the second groove and the second protrusion, and the end portion of the inner pipe portion passes through the leak-proof ring and the flat washer then folding backwards so that the flat washer is pressed on the second protrusion by the end portion of the inner pipe portion.

4. The expansion tank as recited in claim 2, wherein the outer diameter of the second protrusion is smaller than the outer diameter of the first protrusion.

5. The expansion tank as recited in claim 4, wherein the outer diameter of the second protrusion of the plastic lining is greater than the inner diameter of the first groove.

6. The expansion tank as recited in claim 5, wherein the inner diameter of the second groove of second protrusion of the plastic lining is smaller than the inner diameter of the first groove.

\* \* \* \* \*